(12) United States Patent
Monka et al.

(10) Patent No.: US 12,159,447 B2
(45) Date of Patent: Dec. 3, 2024

(54) DEVICE AND METHOD FOR TRAINING A CLASSIFIER

(71) Applicant: Robert Bosch GmbH, Stuttgart (DE)

(72) Inventors: Sebastian Monka, Stuttgart (DE);
Lavdim Halilaj, Leonberg (DE);
Stefan Schmid, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 349 days.

(21) Appl. No.: 17/457,130

(22) Filed: Dec. 1, 2021

(65) Prior Publication Data
US 2022/0198781 A1    Jun. 23, 2022

(30) Foreign Application Priority Data
Dec. 17, 2020  (DE) ................... 10 2020 216 188.7

(51) Int. Cl.
*G06V 10/774*  (2022.01)
*G06N 5/022*  (2023.01)
*G06V 10/764*  (2022.01)

(52) U.S. Cl.
CPC .......... *G06V 10/774* (2022.01); *G06N 5/022* (2013.01); *G06V 10/764* (2022.01)

(58) Field of Classification Search
CPC .... G06V 10/774; G06V 10/764; G06N 5/022; G06N 5/02; G06N 3/045; G06N 3/08;
(Continued)

(56) References Cited

U.S. PATENT DOCUMENTS

| 2016/0239581 | A1* | 8/2016 | Jaidka | .................... H04L 51/52 |
| 2017/0140275 | A1* | 5/2017 | Sanchez | ................ G06N 20/00 |

(Continued)

OTHER PUBLICATIONS

Zhang et al, Multi-Scale Dynamic Convolutional Network for Knowledge Graph Embedding, 2020, IEEE Transactions of Knowledge and Data Engineering, 34(5): 2335-2347. (Year: 2020).*

(Continued)

*Primary Examiner* — Aaron W Carter
*Assistant Examiner* — Kathleen M Broughton
(74) *Attorney, Agent, or Firm* — NORTON ROSE FULBRIGHT US LLP; Gerard A. Messina

(57) ABSTRACT

A computer-implemented method for training a classifier for classifying an input signal, the input signal comprising image data, the classifier comprising an embedding part configured to determine an embedding depending on the input signal inputted into the classifier and a classification part configured to determine a classification of the input signal depending on a the embedding. The method includes: providing a first training data set of training samples, each training sample comprising an input signal and a corresponding desired classification out of a plurality of classes, providing, in a knowledge graph, additional information associated with at least one of the target classifications, providing a knowledge graph embedding method of the knowledge graph, providing a knowledge graph embedding of the knowledge graph obtained by use of a knowledge graph embedding method, training the embedding part depending on the knowledge graph embedding and the first training data set.

12 Claims, 12 Drawing Sheets

(58) Field of Classification Search
CPC ... G06N 20/00; G06F 18/214; G06F 18/2414; G06F 18/2451
See application file for complete search history.

(56) References Cited

U.S. PATENT DOCUMENTS

| | | | | |
|---|---|---|---|---|
| 2017/0178000 A1* | 6/2017 | Manske | ............... | G06N 5/04 |
| 2019/0095806 A1* | 3/2019 | Martinez Canedo | ... | G06F 18/21 |
| 2020/0050946 A1* | 2/2020 | Lecue | ............... | G06F 18/22 |

OTHER PUBLICATIONS

Wang et al, SUKE: Embedding Model for Prediction in Uncertain Knowledge Graph, 2020, Digital Object Identifier, 9(2021) 3871-3879. (Year: 2021).*

Tiwari et al, Learning semantic Image attributes using Image recognition and knowledge graph embeddings, 2020, arXiv2009.05812v1, pp. 1-7. (Year: 2020).*

Morsing, et al.: "Supervised Domain Adaptation using Graph Embedding", arXiv:2003.04063, (2020), pp. 1-7, https://arxiv.org/abs/2003.04063v2 [accessed on Dec. 10, 2021].

Hadsell et al., "Dimensionality Reduction by Learning an in-Variant Mapping," 2006 IEEE Computer Society Conference on Computer Vision and Pattern Recognition (CVPR'06), vol. 2, 2006, pp. 1-8. <http://yann.lecun.com/exdb/publis/pdf/hadsell-chopra-lecun-06.pdf> Downloaded Dec. 1, 2021.

Chen et al., "A Simple Framework for Contrastive Learning of Visual Representations," Proceedings of the 37th International Conference on Machine Learning, Vienna, Austria, PMLR 119, 2020, pp. 1-11. <http://proceedings.mlr.press/v119/chen20j/chen20j.pdf> Downloaded Dec. 1, 2021.

Khosla et al., "Supervised Contrastive Learning," 34th Conference on Neural Information Processing Systems (NEURIPS 2020), Vancouver, Canada, 2020, pp. 1-13. <https://proceedings.neurips.cc/paper/2020/file/d89a66c7c80a29b1bdbab0f2a1a94af8-Paper.pdf> Downloaded Dec. 1, 2021.

Tian et al., "Rethinking Few-Shot Image Classification: a Good Embedding is All You Need?," European Conference on Computer Vision, 2020, pp. 1-17. <https://www.ecva.net/papers/eccv_2020/papers_ECCV/papers/123590256.pdf> Downloaded Dec. 1, 2021.

\* cited by examiner

DEVICE AND METHOD FOR TRAINING A CLASSIFIER

CROSS REFERENCE

The present application claims the benefit under 35 U.S.C. § 119 of German Patent Application No. DE 102020216188.7 filed on Dec. 17, 2020, which is expressly incorporated herein by reference in its entirety.

FIELD

The present invention relates to a method for training a classifier, a method for using this classifier a computer program and a machine-readable storage medium, a control system, and a training system.

BACKGROUND INFORMATION

The following documents describe a contrastive loss for training machine-learning systems:
  Hadsell, R., Chopra, S., LeCun, Y., "Dimensionality reduction by learning an in-variant mapping," 2006, IEEE Computer Society Conference on Computer Vision and Pattern Recognition (CVPR'06)2, 1735-1742 (2006).
  Chen, T., Kornblith, S., Norouzi, M., Hinton, G. E., "A simple framework for contrastive learning of visual representations,", ArXivabs/2002.05709(2020).
  Khosla, P., Teterwak, P., Wang, C., Sarna, A., Tian, Y., Isola, P., Maschinot, A., Liu, C., Krishnan, D., "Supervised contrastive learning," arXiv. preprintarXiv: 2004.11362 (2020)
  Tian, Y., Wang, Y., Krishnan, D., Tenenbaum, J., Isola, P., "Rethinking few-shot image classification: a good embedding is all you need?" in: ECCV (2020).

SUMMARY

Especially in an open-world context (like, e.g., in automated driving), it is impossible to train a classifier for all contexts. It is therefore important to train a classifier that is robust and context- (or domain-)invariant.

A method in accordance with an example embodiment of the present invention may have advantage that a classifier, particularly an image or audio classifier, can much better be transferred to a new domain or context and hence is more accurate.

Further improvements and example embodiment of disclosed herein.

Machine-learning techniques like, e.g., Deep learning achieve high accuracy in tasks like, e.g., computer vision. However, their accuracy may be not as good when they face a domain change, i.e., as soon as they are used in a domain that differs from their training domain.

For example, a road sign recognition model trained with road signs from a first set of roads signs, e.g., to recognize road signs in Germany may perform poorly in countries with roads signs from a second set of road signs, e.g., because of different road sign standards.

A method in accordance with an example embodiment of the present invention may enable cross-domain transfer learning based on prior knowledge (e.g., about the domain or context) which may be provided as 'additional information'.

A knowledge graph serves as a medium for encoding such prior knowledge, which is then transformed into a dense vector representation via embedding methods.

Since knowledge graphs are manually curated by human experts, they are explainable, and can be enriched with machine learning methods and language information.

As a result, a domain-invariant embedding space is formed (based on the prior knowledge), independent of data distributions collected from observations.

By using a contrastive loss-function (i.e., training objective function), it is possible to guide the machine-learning system to adjust its data embedding space according to the domain-invariant space.

This allows the neural network to incorporate training data from different target domains that are already represented in the knowledge graph.

Embodiments of the present invention will be discussed with reference to the following figures in more detail.

DETAILED DESCRIPTION OF EXAMPLE EMBODIMENTS

Figure 1:
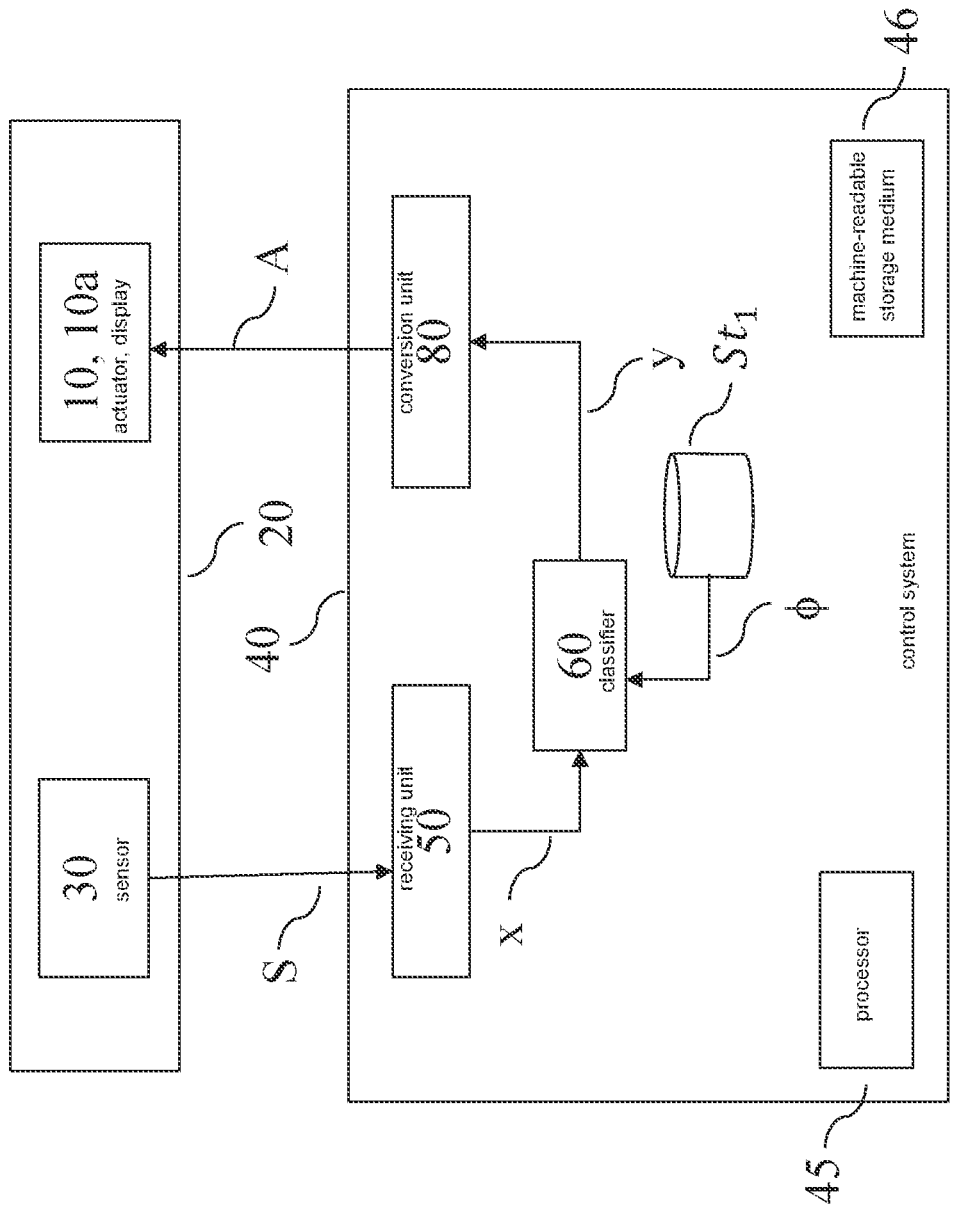
FIG. 1 shows a control system comprising a classifier controlling an actuator in its environment, in accordance with an example embodiment of the present invention.

Shown in FIG. 1 is an embodiment of an actuator (10) in its environment (20). The actuator (10) interacts with a control system (40). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input signals (x). Alternatively, in case of no receiving unit (50), each sensor signal (S) may directly be taken as an input signal (x). The input signal (x) may, for example, be given as an excerpt from the sensor signal (S). Alternatively, the sensor signal (S) may be processed to yield the input signal (x). In other words, the input signal (x) is provided in accordance with the sensor signal (S).

The input signal (x) is then passed on to a classifier (60).

The classifier (60) is parametrized by parameters, which are stored in and provided by a parameter storage ($St_1$).

The classifier (60) determines an output signal (y) from the input signals (x). The output signal (y) comprises information that assigns one or more labels to the input signal (x). The output signal (y) is transmitted to an optional conversion unit (80), which converts the output signal (y) into the control signals (A). The control signals (A) are then transmitted to the actuator (10) for controlling the actuator (10) accordingly.

Alternatively, the output signal (y) may directly be taken as control signal (A).

The actuator (10) receives control signals (A), is controlled accordingly, and carries out an action corresponding to the control signal (A). The actuator (10) may comprise a control logic that transforms the control signal (A) into a further control signal, which is then used to control the actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the invention.

Figure 2:
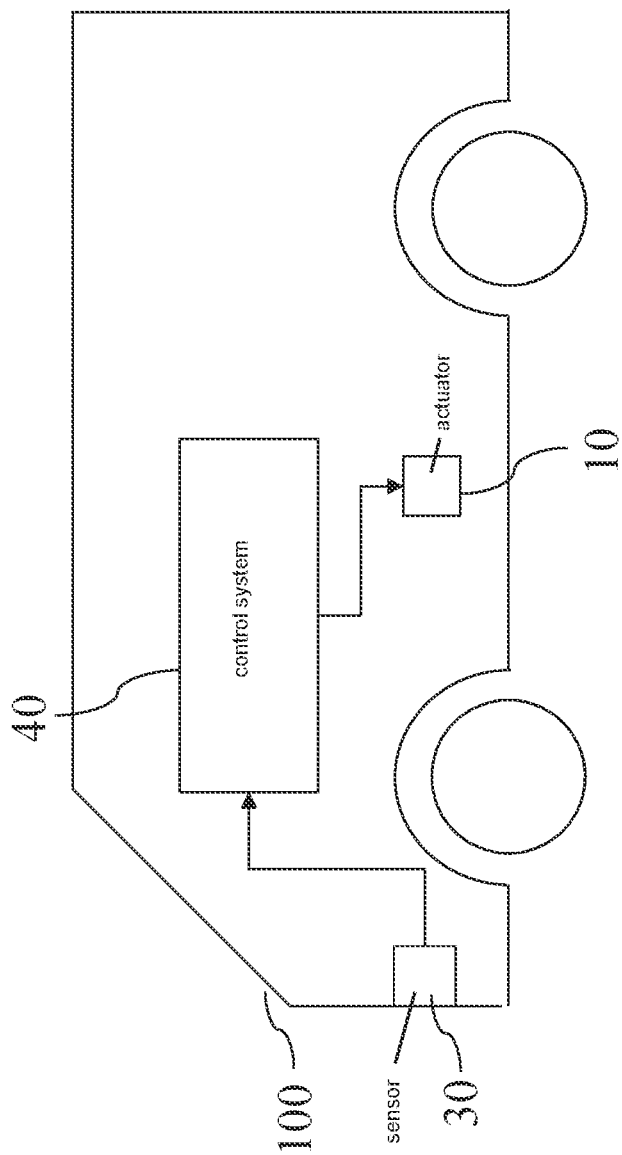
FIG. 2 shows the control system controlling an at least partially autonomous robot, in accordance with an example embodiment of the present invention.

FIG. 2 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors and/or one or more thermal imaging sensors. Some or all of these sensors are preferably but not necessarily integrated in the vehicle (100). The input signal (x) may hence be understood as an input image and the classifier (60) as an image classifier. It is understood that the term 'image classifier' may comprise an image detector (as a classification whether or not an object is present) and a system that determines a semantic segmentation (as an area-wise, e.g., pixel-wise, classification).

The image classifier (60) may be configured to detect objects in the vicinity of the at least partially autonomous robot based on the input image (x). The output signal (y) may comprise an information, which characterizes where objects are located in the vicinity of the at least partially autonomous robot. The control signal (A) may then be determined in accordance with this information, for example to avoid collisions with the detected objects.

The actuator (10), which is preferably integrated in the vehicle (100), may be given by a brake, a propulsion system, an engine, a drivetrain, or a steering of the vehicle (100). The control signal (A) may be determined such that the actuator (10) is controlled such that vehicle (100) avoids collisions with the detected objects. The detected objects may also be classified according to what the classifier (60) deems them most likely to be, e.g., pedestrians or trees, and the control signal (A) may be determined depending on the classification.

Alternatively or additionally, the control signal (A) may also be used to control the display (10a), e.g., for displaying the objects detected by the image classifier (60). It can also be imagined that the control signal (A) may control the display (10a) such that it produces a warning signal, if the vehicle (100) is close to colliding with at least one of the detected objects. The warning signal may be a warning sound and/or a haptic signal, e.g., a vibration of a steering wheel of the vehicle.

In further embodiments, the sensor (30) may comprise an audio sensor, the input signal (x) may be understood as an input sound signal and the classifier (60) as a sound (or audio) classifier, which may be particularly useful to detect, e.g., an ambulance or a police car.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, a control signal (A) may be determined to cause the actuator (10) to spray the plants with a suitable quantity of suitable liquids and/or cut the plants.

In even further embodiments, the at least partially autonomous robot may be given by a domestic appliance (not shown), like, e.g., a washing machine, a stove, an oven, a microwave, or a dishwasher. The sensor (30), e.g., an optical sensor, may detect a state of an object, which is to undergo processing by the household appliance. For example, in the case of the domestic appliance being a washing machine, the sensor (30) may detect a state of the laundry inside the washing machine. The control signal (A) may then be determined depending on a detected material of the laundry.

Figure 3:
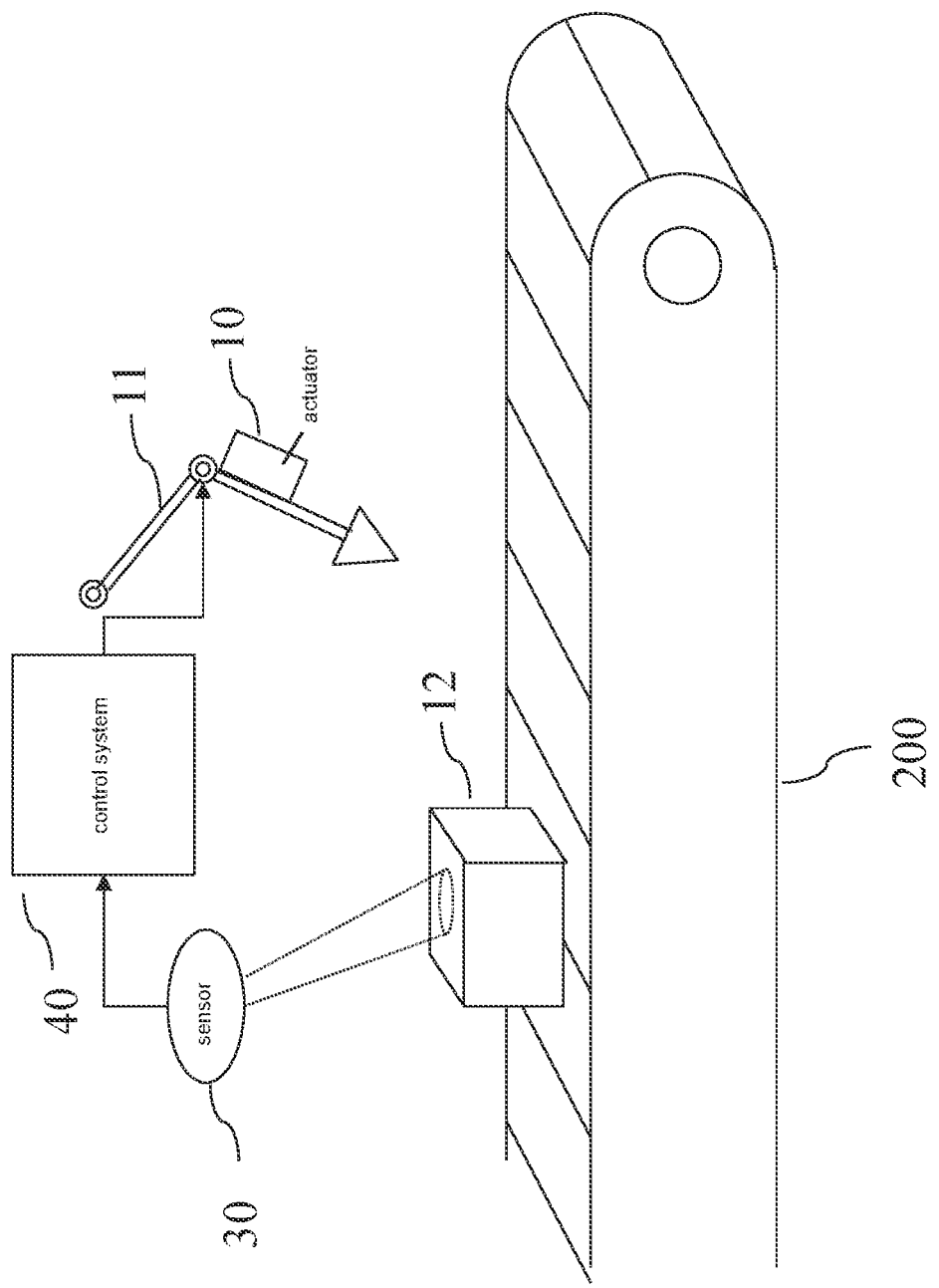
FIG. 3 shows the control system controlling a manufacturing machine, in accordance with an example embodiment of the present invention.

Shown in FIG. 3 is an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor, which captures properties of, e.g., a manufactured product (12). The classifier (60) may hence be understood as an image classifier.

The image classifier (60) may determine a position of the manufactured product (12) with respect to the transportation device. The actuator (10) may then be controlled depending on the determined position of the manufactured product (12) for a subsequent manufacturing step of the manufactured product (12). For example, the actuator (10) may be controlled to cut the manufactured product at a specific location of the manufactured product itself. Alternatively, it may be envisioned that the image classifier (60) classifies, whether the manufactured product is broken or exhibits a defect. The actuator (10) may then be controlled as to remove the manufactured product from the transportation device.

Figure 4:
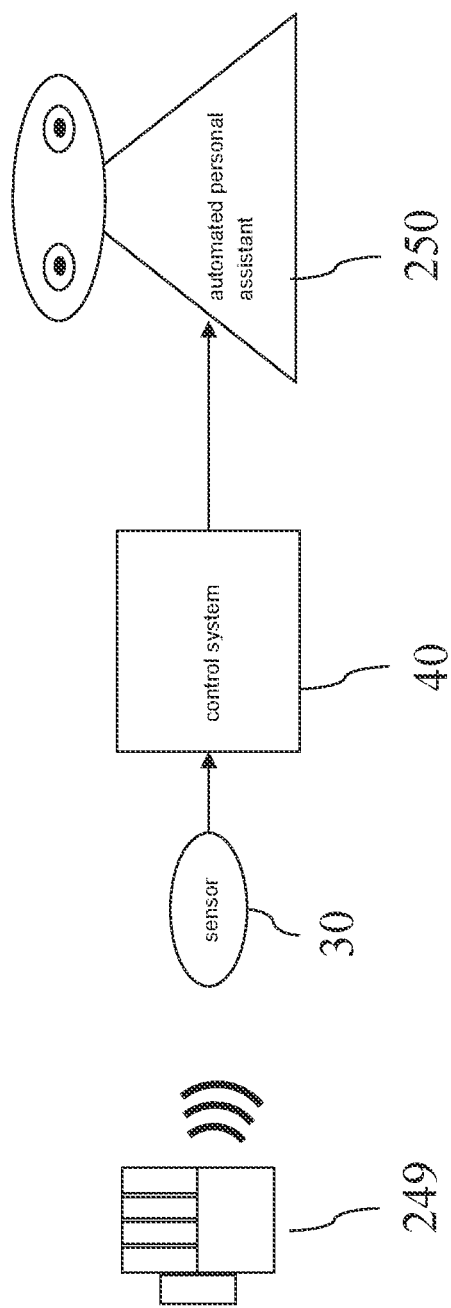
FIG. 4 shows the control system controlling an automated personal assistant, in accordance with an example embodiment of the present invention.

Shown in FIG. 4 is an embodiment in which the control system (40) is used for controlling an automated personal assistant (250). The sensor (30) may be an optical sensor, e.g., for receiving video images of a gestures of a user (249). Alternatively, the sensor (30) may also be an audio sensor, e.g., for receiving a voice command of the user (249).

The control system (40) then determines control signals (A) for controlling the automated personal assistant (250). The control signals (A) are determined in accordance with the sensor signal (S) of the sensor (30). The sensor signal (S) is transmitted to the control system (40). For example, the classifier (60) may be configured to, e.g., carry out a gesture recognition algorithm to identify a gesture made by the user (249). The control system (40) may then determine a control signal (A) for transmission to the automated personal assistant (250). It then transmits the control signal (A) to the automated personal assistant (250).

For example, the control signal (A) may be determined in accordance with the identified user gesture recognized by the classifier (60). It may comprise information that causes the automated personal assistant (250) to retrieve information from a database and output this retrieved information in a form suitable for reception by the user (249).

In further embodiments, it may be envisioned that instead of the automated personal assistant (250), the control system (40) controls a domestic appliance (not shown) controlled in accordance with the identified user gesture. The domestic appliance may be a washing machine, a stove, an oven, a microwave or a dishwasher.

Figure 5:
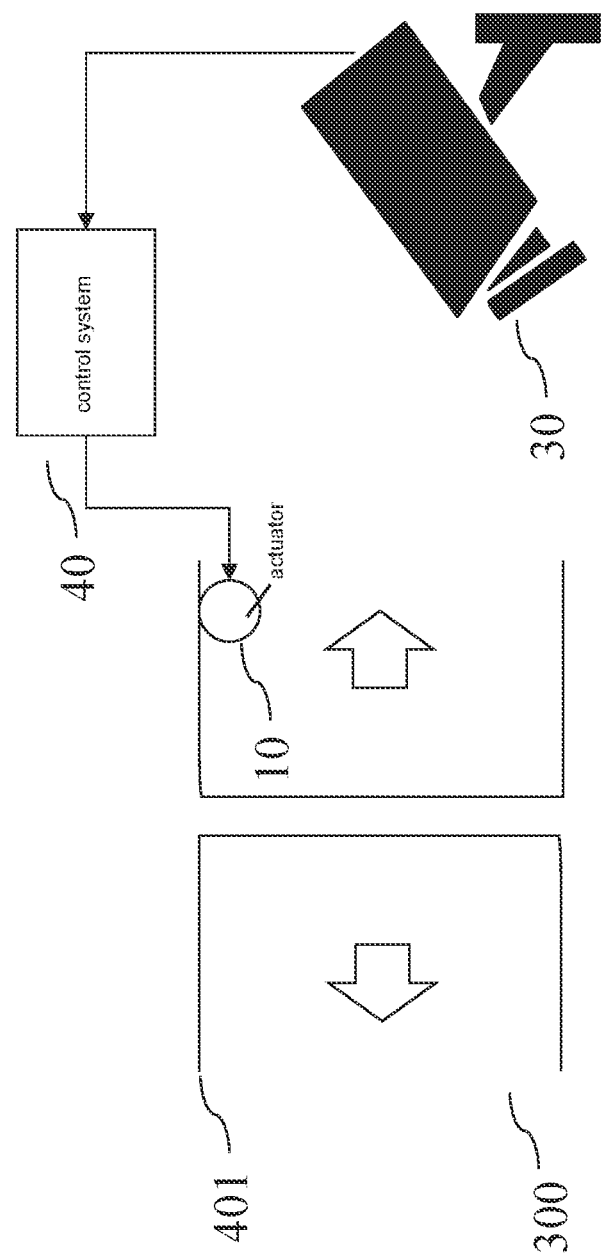
FIG. 5 shows the control system controlling an access control system, in accordance with an example embodiment of the present invention.

Shown in FIG. 5 is an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may, for example, be an optical sensor for providing image or video data, e.g., for detecting a person's face. The classifier (60) may hence be understood as an image classifier.

The image classifier (60) may be configured to classify an identity of the person, e.g., by matching the detected face of the person with other faces of known persons stored in a database, thereby determining an identity of the person. The control signal (A) may then be determined depending on the classification of the image classifier (60), e.g., in accordance with the determined identity. The actuator (10) may be a lock that opens or closes the door depending on the control signal (A). Alternatively, the access control system (300) may be a non-physical, logical access control system. In this case, the control signal may be used to control the display (10a) to show information about the person's identity and/or whether the person is to be given access.

In further embodiments, the classifier (60) may be understood to be or comprise an audio classifier that may, for example, be configured to identify a person from a received voice audio signal.

Figure 6:
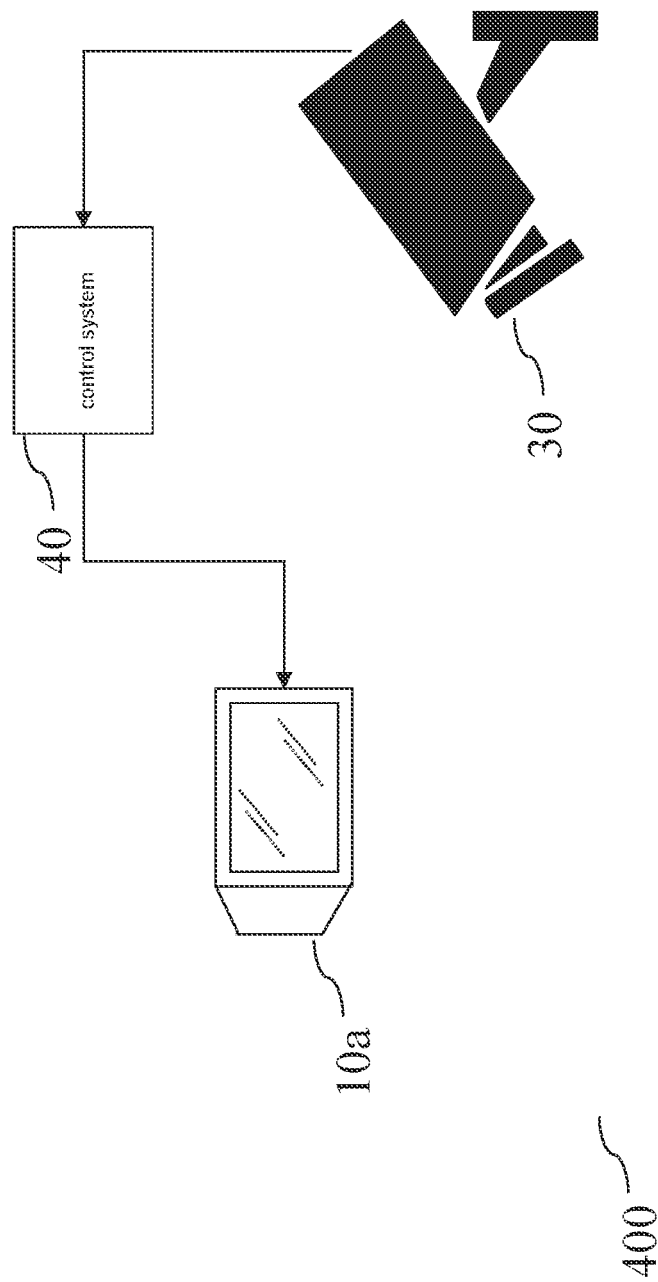
FIG. 6 shows the control system controlling a surveillance system, in accordance with an example embodiment of the present invention.

Shown in FIG. 6 is an embodiment in which the control system (40) controls a surveillance system (400). This embodiment is largely identical to the embodiment shown in FIG. 5. Therefore, only the differing aspects will be described in detail. The sensor (30) is configured to detect a scene that is under surveillance. The control system (40) does not necessarily control an actuator (10), but may alternatively control a display (10a). For example, the image classifier (60) may determine a classification of a scene, e.g., whether the scene detected by an optical sensor (30) is normal or whether the scene exhibits an anomaly. The control signal (A), which is transmitted to the display (10a), may then, for example, be configured to cause the display (10a) to adjust the displayed content dependent on the determined classification, e.g., to highlight an object that is deemed anomalous by the image classifier (60).

Figure 7:
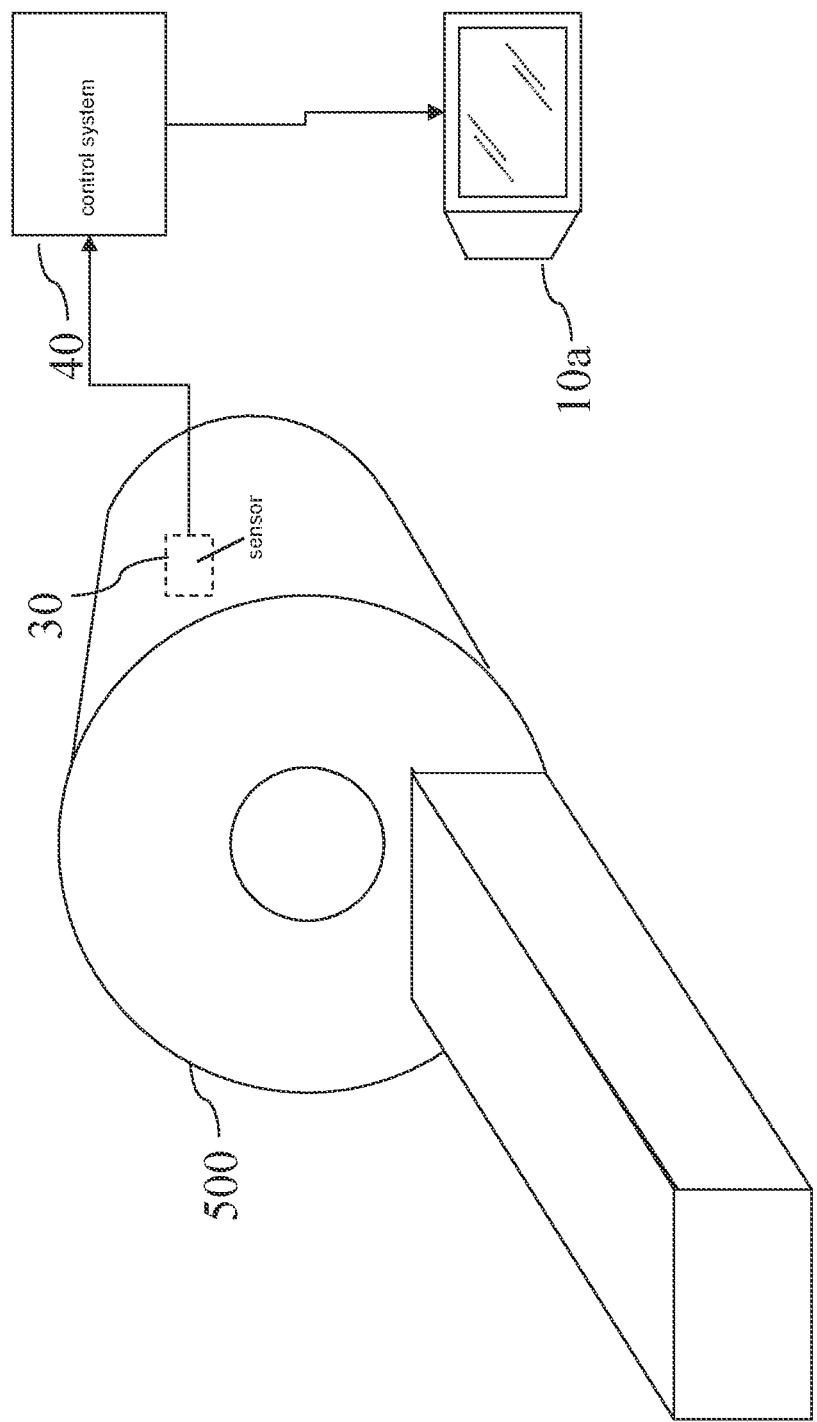
FIG. 7 shows the control system controlling an imaging system, in accordance with an example embodiment of the present invention.

Shown in FIG. 7 is an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The classifier (60) may then determine a classification of at least a part of the sensed image. The at least part of the image is hence used as input image (x) to the classifier (60). The classifier (60) may hence be understood as an image classifier.

The control signal (A) may then be chosen in accordance with the classification, thereby controlling a display (10a). For example, the image classifier (60) may be configured to detect different types of tissue in the sensed image, e.g., by classifying the tissue displayed in the image into either malignant or benign tissue. This may be done by means of a semantic segmentation of the input image (x) by the image classifier (60). The control signal (A) may then be determined to cause the display (10a) to display different tissues, e.g., by displaying the input image (x) and coloring different regions of identical tissue types in a same color.

In further embodiments (not shown) the imaging system (500) may be used for non-medical purposes, e.g., to determine material properties of a work piece. In these embodiments, the image classifier (60) may be configured to receive an input image (x) of at least a part of the work piece and perform a semantic segmentation of the input image (x), thereby classifying the material properties of the work piece. The control signal (A) may then be determined to cause the display (10a) to display the input image (x) as well as information about the detected material properties.

Figure 8:
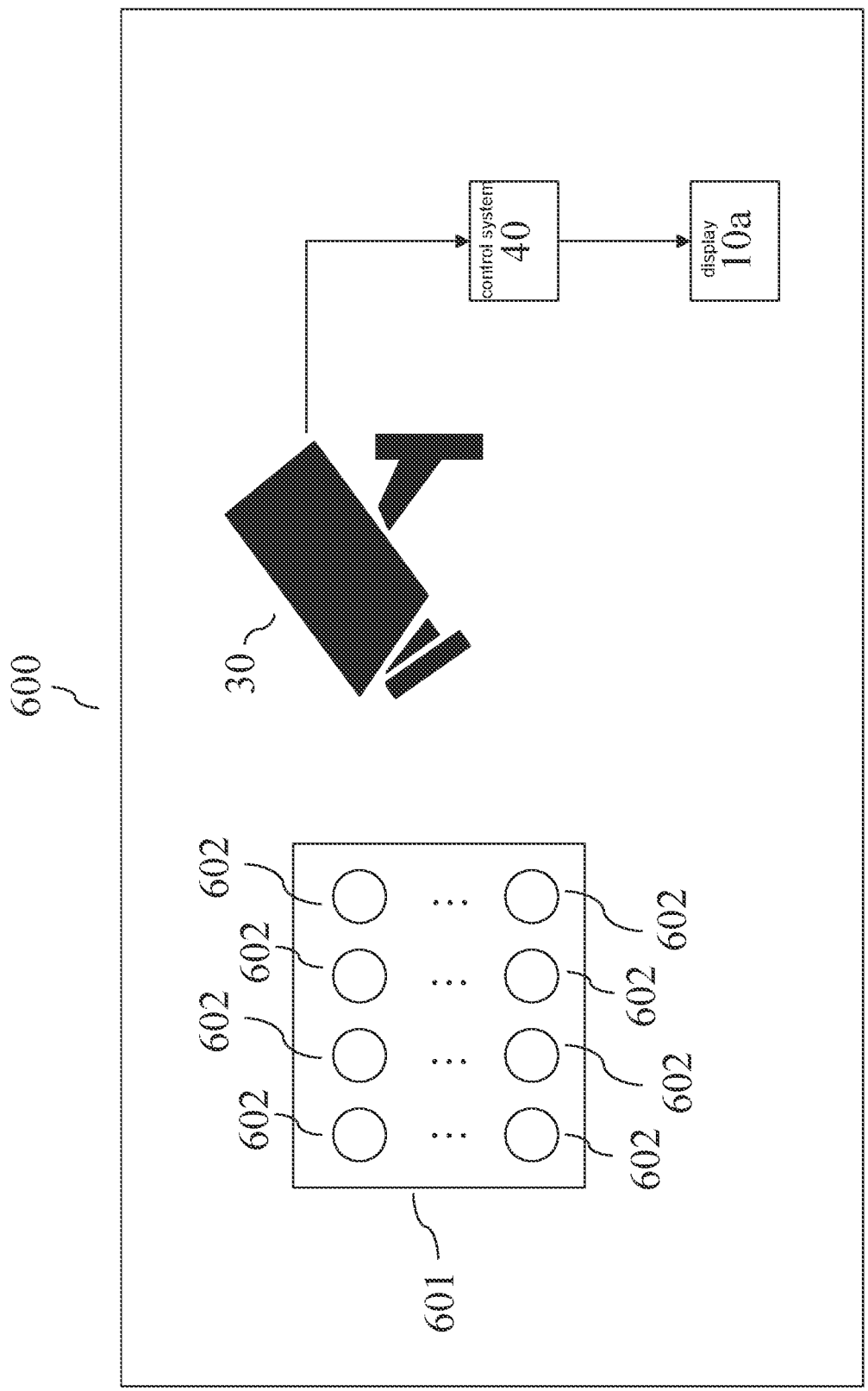
FIG. 8 shows the control system controlling a medical analysis system, in accordance with an example embodiment of the present invention.

Shown in FIG. 8 is an embodiment of a medical analysis system (600) that is controlled by the control system (40). The medical analysis system (600) is supplied with a microarray (601), wherein the microarray comprises a plurality of spots (602, also known as features) which have been exposed to a medical specimen. The medical specimen may, for example, be a human specimen or an animal specimen, e.g., obtained from a swab.

The microarray (601) may be a DNA microarray or a protein microarray.

The sensor (30) is configured to sense the microarray (601). The sensor (30) is preferably an optical sensor such as a video sensor. The classifier (60) may hence be understood as an image classifier.

The image classifier (60) is configured to classify a result of the specimen based on an input image (x) of the microarray supplied by the sensor (30). In particular, the image classifier (60) may be configured to determine whether the microarray (601) indicates the presence of a virus in the specimen.

The control signal (A) may then be chosen such that the display (10a) shows the result of the classification.

Figure 9:
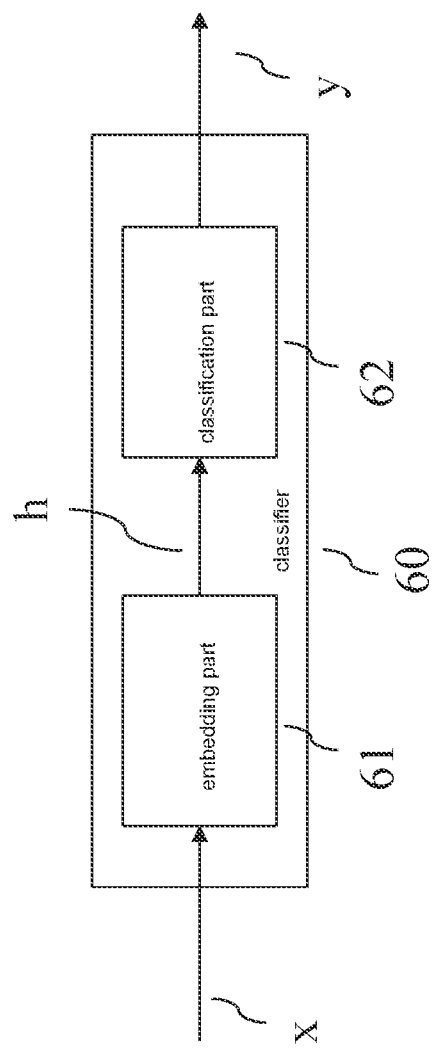
FIG. 9 shows an exemplary structure of the classifier, in accordance with an example embodiment of the present invention.

Shown in FIG. 9 are embodiments of classifier (60). It comprises an embedding part (61) and a classification part (62). The embedding part (61) is configured to receive input signal (x) and determine an embedding (h). The classification part (62) receives the embedding (h) and determines a classification as output signal (y).

In some embodiments, the classification part (62) may be a linear classifier. For example, in some embodiments, classifier (60) may comprise a neural network, and the classification part (62) may, e.g., be given by a fully-connected layer followed by an argmax layer. In some embodiments, classifier (60) may comprise a convolutional neural network, and the embedding part (61) may comprise multiple convolution layers.

Figure 10:
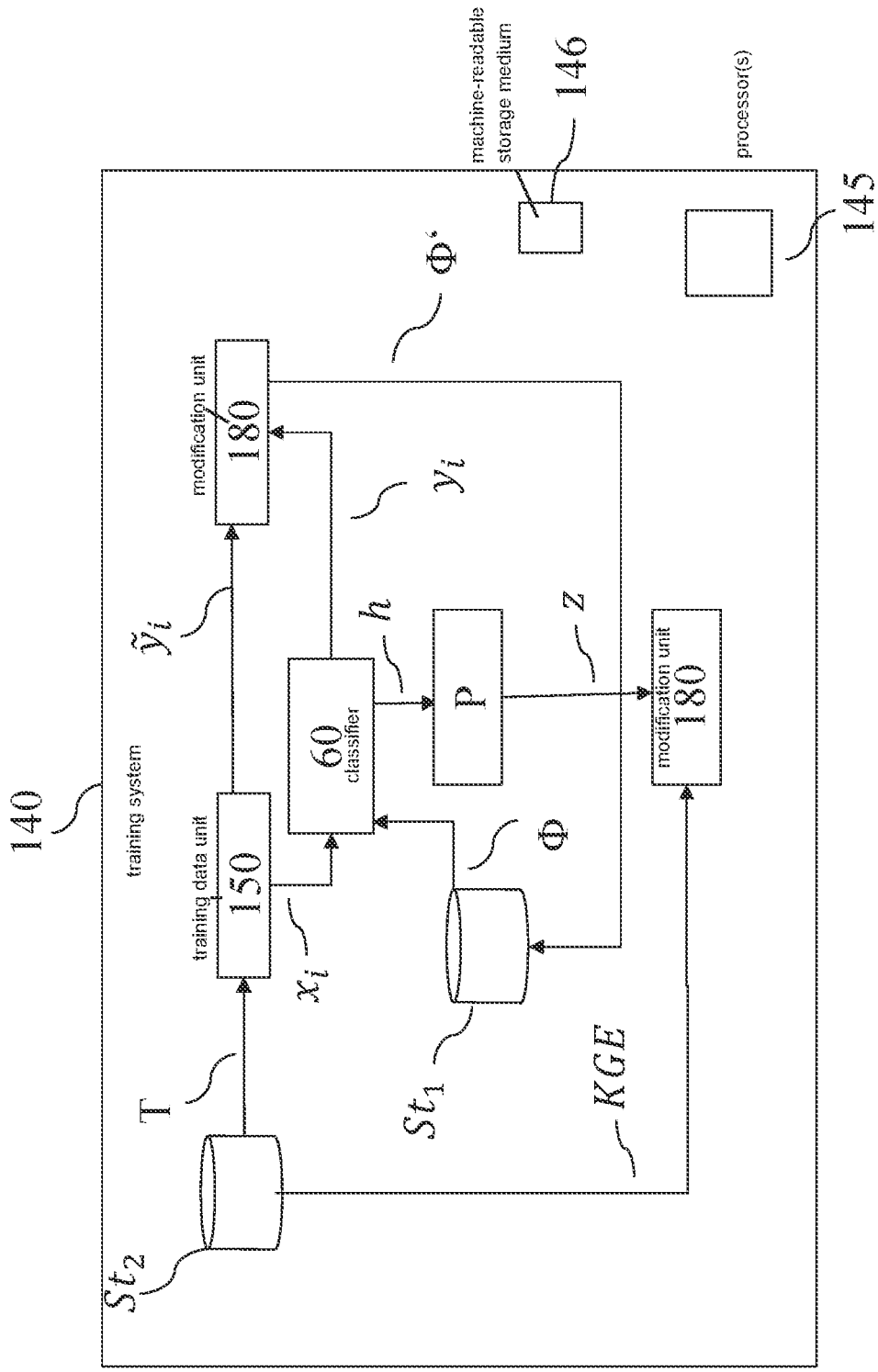
FIG. 10 shows a training system for training the classifier, in accordance with an example embodiment of the present invention.

FIG. 10 shows embodiments of a training system (140) for training the classifier (60) of the control system (40) by means of a training data set (T). The training data set (T) comprises a plurality of input signals ($x_i$) which are used for training the classifier (60), wherein the training data set (T) further comprises, for each input signal ($x_i$), a desired output signal ($y_i$) which corresponds to the input signal ($x_i$) and characterizes a classification of the input signal ($x_i$).

For training, a training data unit (150) accesses a computer-implemented database ($St_2$), the database ($St_2$) providing the training data set (T). The training data unit (150) determines from the training data set (T) preferably randomly at least one input signal ($x_i$) and the desired output signal ($\tilde{y}_i$) corresponding to the input signal ($x_i$) and transmits the input signal ($x_i$) to the classifier (60). The classifier (60) determines an output signal ($y_i$) based on the input signal ($x_i$).

The desired output signal ($\tilde{y}_i$) and the determined output signal ($y_i$) are transmitted to a modification unit (180).

Based on the desired output signal ($\tilde{y}_i$) and the determined output signal ($y_i$), the modification unit (180) then determines new parameters ($\Phi'$) for the classifier (60). For this purpose, the modification unit (180) compares the desired output signal ($\tilde{y}_i$) and the determined output signal ($y_i$) using a training objective function, also known as loss function. The loss function determines a first loss value that characterizes how far the determined output signal ($y_i$) deviates from the desired output signal ($\tilde{y}_i$). In the given embodiment, a negative log-likelihood function is used as the loss function. Other loss functions are also possible in alternative embodiments.

Furthermore, it is possible that the determined output signal ($y_i$) and the desired output signal ($\tilde{y}_{ii}$) each comprise a plurality of sub-signals, for example in the form of tensors, wherein a sub-signal of the desired output signal ($\tilde{y}_i$) corresponds to a sub-signal of the determined output signal ($y_i$). It is possible, for example, that the classifier (60) is configured for object detection and a first sub-signal characterizes a probability of occurrence of an object with respect to a part of the input signal ($x_i$) and a second sub-signal characterizes the exact position of the object. If the determined output signal ($y_i$) and the desired output signal ($\tilde{y}_i$) comprise a plurality of corresponding sub-signals, a second loss value is preferably determined for each corresponding sub-signal by means of a suitable loss function and the determined second loss values are suitably combined to form the first loss value, for example by means of a weighted sum.

The modification unit (180) determines the new parameters ($\Phi'$) based on the first loss value. In the given embodiment, this is done using a gradient descent method, preferably stochastic gradient descent, Adam, or AdamW.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value. In at least one of the iterations the new parameters ($\Phi'$) determined in a previous iteration are used as parameters ($\Phi$) of the classifier (60).

The training system (140) is further configured to provide a knowledge graph embedding (KGE), which may, for example, also be stored in the database ($St_2$) and provided to the modification unit (180).

Knowledge graph embeddings are available in the related art to represent the information from the graph structure of the knowledge graph as a dense vector representation in which entities of the knowledge graph and their relationships are mapped via their (dis)similarities. Thus, if an entity has a close connection to other entities in the graph, these closely connected entities are represented close to each other in the vector space.

For each class c, a knowledge graph embedding vector $h_{KG}$=KGE(c) may be determined, e.g., by modification unit (180). Embedding (h) obtained by the embedding part (61) of classifier (60) is provided to an optional projection network (P), which may be configured to map embedding (h) onto a projection vector z=P(h) that matches the dimensionality of knowledge graph embedding vector $h_{KG}$. Projection network (P) may, for example, be given by a multi-layer perceptron, for example with a single hidden layer.

Furthermore, the training system (140) may comprise at least one processor (145) and at least one machine-readable storage medium (146) containing instructions which, when executed by the processor (145), cause the training system (140) to execute a training method according to one of the aspects of the invention.

Figure 11:
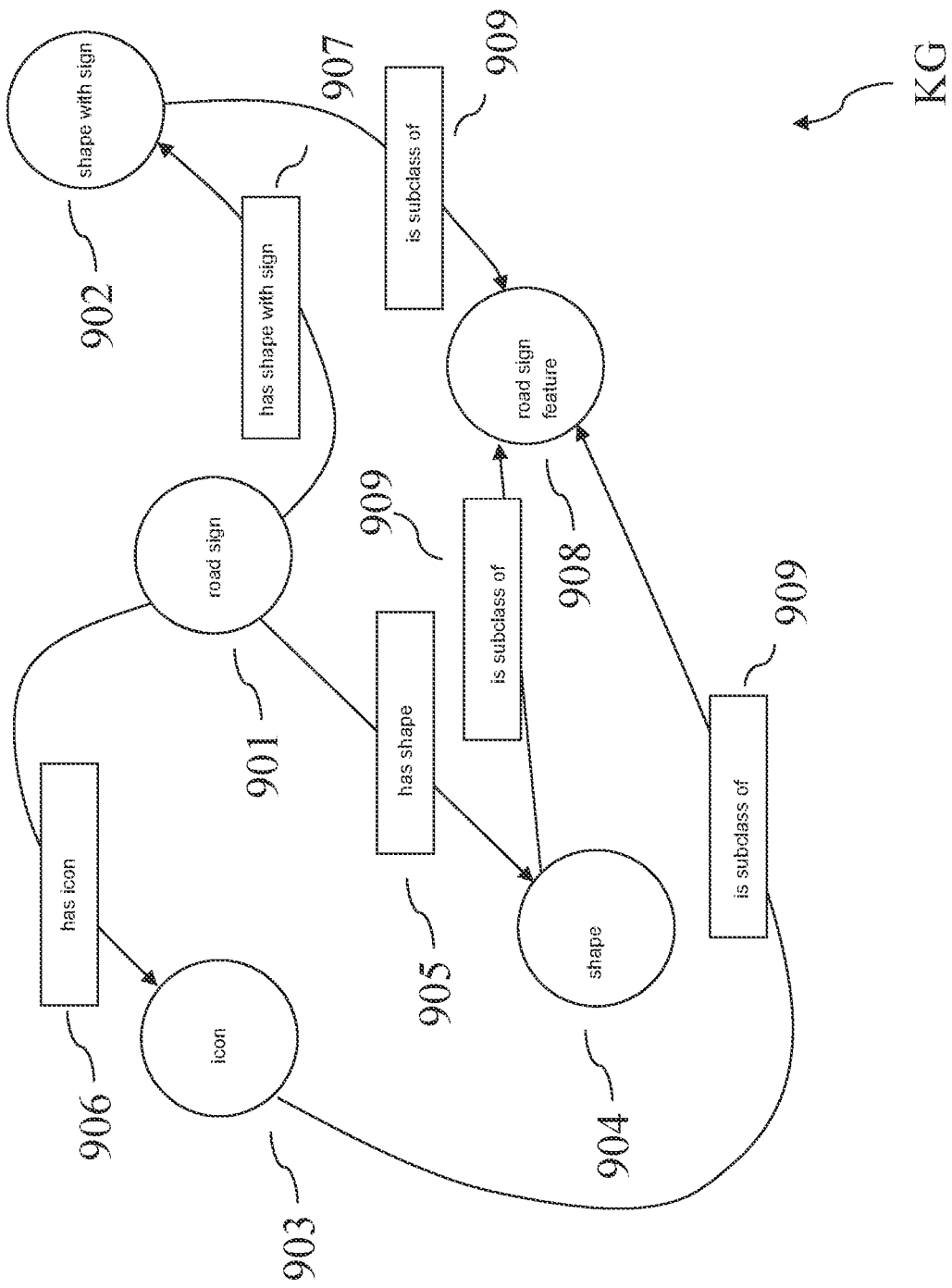
FIG. 11 shows an illustration of a knowledge graph, in accordance with an example embodiment of the present invention.
Figure 12:
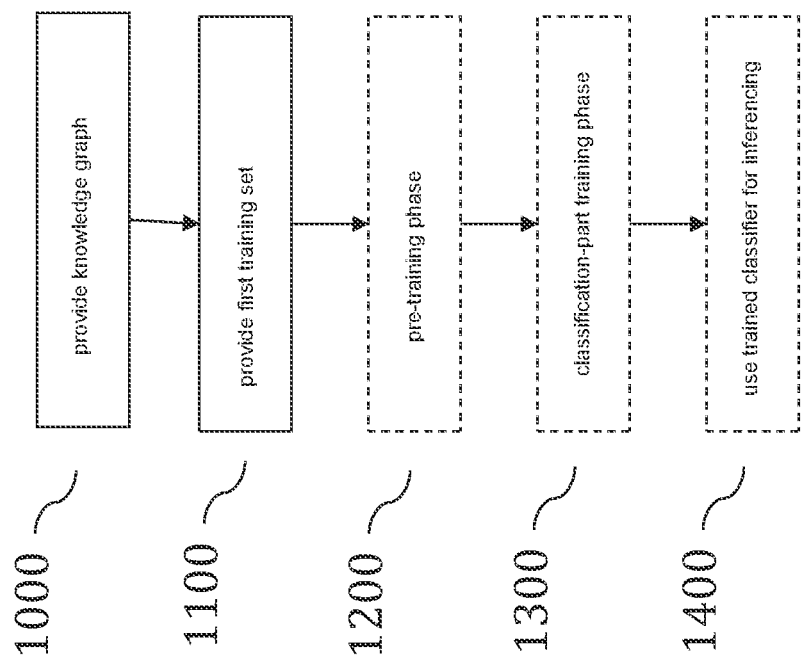
FIG. 12 shows a flow-chart diagram of a training method carried out by the training system, in accordance with an example embodiment of the present invention.

Illustrated in FIG. 11 is a part of a knowledge graph (KG) for the domain of road-signs if classifier (60) is an image classifier for road-sign recognition. The knowledge graph (KG) contains all classes of the training data set (T) and is incorporated in an underlying domain ontology. The domain ontology comprises entities (901, 902, 903, 904, and 908) and relations (905, 906, 907, and 909) between said entities. For example, entities may be given as "Road Sign" (901), "Shape with Sign" (902), "Icon" (903), "Shape" (904) or "Road Sign Feature" (908). Relations may be given as "has Shape" (905), "has Icon" (906), "has Shape with Sign" (907), or "is Subclass of" (909). Each class (c) may then be represented by an entity in the knowledge graph (KG).

Shown in FIG. 11 is a flow chart diagram that illustrates embodiments for executing the training of classifier (60).

First (1000), a knowledge graph embedding (KGE) of knowledge graph (KG) is provided.

Then (1100), in a source pre-training phase, a first training set (also called source training set) is provided. The parameters ($\Phi$) associated with embedding part (61) are then updated by contrasting input signals (x) against their labels $h_{KG}=KGE(\tilde{y}_i)$ encoded in knowledge graph embedding space.

Specifically, a contrastive loss function $L_{KG}$ may be defined for a contrastive prediction task. Generally speaking, given a set of input signals $\{x_n\}$ including a positive pair of examples $x_a$ and $x_p$, the contrastive prediction task aims to identify $x_p$ in $\{x_n\}_{n \neq a}$ for a given $x_a$.

Within a minibatch of 2N training samples, $a \in \{1 \ldots 2N\}$ is selected as the anchor-index of a class label. An input signal $(x_p)$ corresponding to the same class, i.e., having the same desired classification $(\tilde{y}_p)$ as input signal $(x_a)$ corresponding to anchor-index, will be denoted with a positive-index p. Likewise, input signals $(x_n)$ from another class will be denoted with a negative-index n.

The contrastive loss function may then be given by $$\mathcal{L}_{KG} = \sum\nolimits_{a=1 \ldots 2N} \mathcal{L}_{KG,a},$$

with $$\mathcal{L}_{KG,a} = \frac{-1}{2N_{\tilde{y}_a}-1} \sum_{p=1}^{2N} \mathbb{1}_{a \neq p} \cdot \mathbb{1}_{\tilde{y}_a = \tilde{y}_p} \cdot \log \frac{\exp(h_{KG,a} \cdot z_p / \tau)}{\sum_{n=1}^{2N} \mathbb{1}_{a \neq n} \exp(h_{KG,a} \cdot z_n / \tau)}$$

where $z_i = P(E(x_i))$, and $$\mathbb{1}_{n \neq a} \in \{0,1\}$$

is an indicator function that returns 1 iff n≠a evaluates as true, and τ>0 is a predefined parameter. $h_{KG,a} \cdot z_p$ computes an inner product between the normalized vectors $h_{KG,a}$ and $z_p$ as a similarity score. For each anchor-index a, there can be many positives and negatives and the denominator has a total of 2N−1 terms, containing terms with positive-index and terms with negative-index. During training, for any 'a', parameters of the embedding part (61) may be tuned to maximize the numerator of the log argument, while simultaneously minimizing its denominator. $N_{\tilde{y}_a}$ is the total number of samples in the minibatch that have the same label, $\tilde{y}_a$, as the anchor, a. This loss hence is able to handle arbitrary numbers of positives belonging to the same class. During training in this step, i.e., optimization of this loss function $L_{KG}$, the embedding part (61) learns the projection (z) and the embeddings h of the positive-index input signals $x_p$ to map the corresponding class label in the knowledge graph embedding $h_{KG}$ and simultaneously pushes the embedding of the negative-index input signals $x_n$ to non-neighboring representations.

The classifier (60) thus obtained, specifically the classifier (60) with the thus-obtained embedding part (61) is called the source-trained classifier.

After this source-domain pre-training phase, in an optional target-domain pre-training phase (1200), In this phase, a second training set, also called target training set, is provided. To adapt the source-trained classifier to this additional target training set, it may be envisioned in some embodiments to apply a second contrastive pre-training phase using the same domain-invariant space from the first pre-training (1100) on the source domain.

Because the classes of the target trainings set are represented in the knowledge graph embedding (KGE), the classifier (60) has already been adapted to the target classes during the source pre-training phase (1100) even without data from the target domain. Therefore, in this second pre-training phase (1200), data information from the target domain can enrich the embedding without disturbing the structures learned on the source domain.

It will be appreciated that the training effort necessary in this target-domain pre-training phase (1200) is small, as the exploitation of structure captured by the knowledge graph embedding (KGE) makes the source-trained classifier easily adaptable by this transfer learning approach.

It will further be appreciated that because of said exploitation of structure, during the target-domain pre-training phase (1200), the source-trained classifier does not suffer from a phenomenon known in the related art as "catastrophic forgetting", i.e., that learnings from previous training sets may be omitted while training on a new training set.

The classifier (60) thus obtained, specifically the classifier (60) with the thus-obtained embedding part (61) is called the target-trained classifier.

Next, in an optional classification-part training phase (1300), the classification part (62) of classifier (60) may be trained. In case the target-domain pre-training (1200) has been carried out, this training may be carried out with data from both the source domain and the target domain. In case the target-domain pre-training (1200) has been omitted, training may be carried out with the data from the source domain only.

In further embodiments, it may be envisioned to train the classifier (60) on a plurality of target domains, by repeating step (1200) for each desired target domain.

For example, the parameters of the classification part (62) may be randomly initialized and trained with conventional methods, like e.g., a cross-entropy loss. Preferably, the parameters of the embedding part (61) remain unchanged.

In an optional step (1400), the trained classifier (60) may then be used for inferencing as illustrated in the embodiments corresponding to FIGS. 1 to 8. This concludes the method.

The term "computer" may be understood as covering any devices for the processing of pre-defined calculation rules. These calculation rules can be in the form of software, hardware or a mixture of software and hardware.

What is claimed is:

1. A computer-implemented method for training a classifier for classifying an input signal, the input signal including image data, the classifier including an embedding part configured to determine an embedding depending on the input signal inputted into the classifier and a classification part configured to determine a classification of the input signal depending on the embedding, the method comprising the following steps:
    providing a first training data set of training samples, each of the training samples including an input signal including image data and a corresponding target classification out of a plurality of classes;
    providing, in a knowledge graph, additional information associated with at least one of the target classifications;
    providing a knowledge graph embedding method of the knowledge graph;
    providing a knowledge graph embedding of the knowledge graph obtained by use of the knowledge graph embedding method; and
    training the embedding part depending on the knowledge graph embedding and the first training data set.

2. The method according to claim 1, wherein the step of training the embedding part includes adjusting parameters of the embedding part of the classifier in accordance with a training objective function that characterizes a degree of similarity between a knowledge graph embedding of a target classification of an input signal and determined embeddings of the input signals of those of the training samples which have the same target classification as the input signal.

3. The method according to claim 2, wherein the training objective function is a contrastive learning training objective.

4. The method according to claim 1, further comprising the following steps:
providing a second training data set of training samples, each of the training samples of the second data set including an input signal and a corresponding target classification out of a plurality of classes; and
training the embedding part depending on the knowledge graph embedding and the second training data set.

5. The method according to claim 4, wherein the first training data set and the second training data set are from different domains.

6. The method according to claim 1, wherein additional information associated with each one of the target classifications contained in the plurality of classes is provided in the knowledge graph.

7. The method according to claim 1, wherein after training the embedding part, the method further comprises training the classification part.

8. The method according to claim 1, wherein after training the classifier, the method further comprises using the classifier by classifying input signals inputted into the classifier and obtaining an output signal which is characteristic of the classification.

9. The method according to claim 8, wherein in the step of using the classifier, the method further comprises providing a control signal for operating a technical system in accordance with the output signal.

10. A non-transitory machine-readable storage medium on which is stored a computer program for training a classifier for classifying an input signal, the input signal including image data, the classifier including an embedding part configured to determine an embedding depending on the input signal inputted into the classifier and a classification part configured to determine a classification of the input signal depending on the embedding, the computer program, when executed by a computer, causing the computer to perform the following steps:
providing a first training data set of training samples, each of the training samples including an input signal including image data and a corresponding target classification out of a plurality of classes;
providing, in a knowledge graph, additional information associated with at least one of the target classifications;
providing a knowledge graph embedding method of the knowledge graph;
providing a knowledge graph embedding of the knowledge graph obtained by use of the knowledge graph embedding method; and
training the embedding part depending on the knowledge graph embedding and the first training data set.

11. A control system for operating an actuator, the control system comprising:
a classifier trained for classifying an input signal, the input signal including image data, the classifier including an embedding part configured to determine an embedding depending on the input signal inputted into the classifier and a classification part configured to determine a classification of the input signal depending on the embedding, the classifier trained by:
providing a first training data set of training samples, each of the training samples including an input signal including image data and a corresponding target classification out of a plurality of classes;
providing, in a knowledge graph, additional information associated with at least one of the target classifications;
providing a knowledge graph embedding method of the knowledge graph;
providing a knowledge graph embedding of the knowledge graph obtained by use of the knowledge graph embedding method; and
training the embedding part depending on the knowledge graph embedding and the first training data set;
wherein the control system is configured to operate the actuator in accordance with an output of the classifier.

12. A training system configured to train a classifier for classifying an input signal, the input signal including image data, the classifier including an embedding part configured to determine an embedding depending on the input signal inputted into the classifier and a classification part configured to determine a classification of the input signal depending on the embedding, the training system configured to:
provide a first training data set of training samples, each of the training samples including an input signal including image data and a corresponding target classification out of a plurality of classes;
provide, in a knowledge graph, additional information associated with at least one of the target classifications;
provide a knowledge graph embedding method of the knowledge graph;
provide a knowledge graph embedding of the knowledge graph obtained by use of the knowledge graph embedding method; and
train the embedding part depending on the knowledge graph embedding and the first training data set.

* * * * *